United States Patent [19]

Ikenaga et al.

[11] Patent Number: 4,730,015

[45] Date of Patent: Mar. 8, 1988

[54] WEATHER RESISTANT POLYACETAL RESIN COMPOSITION

[75] Inventors: Yukio Ikenaga; Masami Yamawaki; Kunio Suzuki, all of Fuji, Japan

[73] Assignee: Polyplastics Co., Ltd., Japan

[21] Appl. No.: 757,595

[22] Filed: Jul. 22, 1985

[30] Foreign Application Priority Data

Jul. 27, 1984 [JP] Japan .................................. 59-156563

[51] Int. Cl.$^4$ .............................................. C08K 5/34
[52] U.S. Cl. ....................................... 524/91; 524/99; 524/102; 524/291; 524/337; 524/338
[58] Field of Search ................. 524/99, 102, 291, 337, 524/338, 91

[56] References Cited

U.S. PATENT DOCUMENTS

| 3,840,494 | 10/1974 | Murayama et al. | 524/99 |
| 3,981,884 | 9/1976 | Wang et al. | 524/91 |
| 4,315,848 | 2/1982 | Dexter et al. | 524/91 |
| 4,446,263 | 5/1984 | Bryant | 524/100 |

*Primary Examiner*—Morton Foelak
*Assistant Examiner*—Kriellion Morgan
*Attorney, Agent, or Firm*—Burns, Doane, Swecker & Mathis

[57] ABSTRACT

A polyacetal resin composition comprises a polyacetal resin as the matrix, (A) 0.01 to 2.0 percent by weight of a stabilizer selected from a benzotriazole compound, a benzophenone compound and an aromatic benzoate compound and (B) 0.01 to 2.0 percent by weight of a hindered amine compound and is improved in whetherability.

7 Claims, No Drawings

WEATHER RESISTANT POLYACETAL RESIN COMPOSITION

The present invention relates to a polyacetal resin compound having excellent weathering properties. The invention presents a polyacetal resin compound suitable for use as a material for various kinds of parts and components used in various fields of application, such as, for example, electrical equipment and appliances, automobiles, textile machinery, cameras, computers, office equipment, sundry goods, etc., and more particularly for those equipment parts and components of which durability is required under conditions of sunlight and atmospheric exposure or under conditions of such relatively high energy irradiation as fluorescent lighting.

[Prior Art]

As is well known, polyacetal resins, as engineering resins having good mechanical, electrical and other physical properties and also good chemical properties such as chemical resistance and heat resistance, have recently been widely used in various fields of industrial application. With the expansion of the range of areas for utilization of polyacetal resins, however, there is a growing tendency that more specific characteristic features are demanded of the resins as industrial materials.

One example of such specific demand is seen in those areas of application in which further improvement in weathering properties is called for. For example, such items as exterior automotive trims, electrical and office equipment parts, and the like are liable to get discolored or lose their surface smoothness or become lusterless under the influence of the conditions to which they are exposed, such as sunlight, fluorescent light, or atmospheric exposure. Further, they are liable to surface cracks under such exposure conditions, which may lead to deterioration in mechanical properties. In order to prevent such troubles, it has been proposed to admix various kinds of weathering stabilizers (or light-resisting agents) with polyacetal resin to improve the weathering (or light-resisting) properties of the polyacetal resin.

In prior stabilizers for polyacetal to weathering or light, such as disclosed in Japanese patent publication (unexamined) No. 98545/82, there are benzotriazole-based materials, benzophenone-based materials, aromatic benzoate-based materials, hindered amine-based materials, and anilide oxalate-based materials. It is known that these weathering stabilizers will prove to be considerably effective if applied to polyacetals. Depending upon the objects of their application, however, they may not always prove to be satisfactory. Indeed, there are cases where further improvements in weathering (or light-resisting) properties are required. However, improvement in weathering properties is limited if attempts are made to meet such requirement through a mere increase in the addition of weathering stabilizers (or light-resisting agents). Furthermore, such increase is often undesirable since it may have an adverse effect on other characteristic features of the resin, and it is not justifiable from an economical standpoint either.

SUMMARY OF THE INVENTION

The invention provides polyacetal resin composition with a more improved resistance to weathering than in the prior art. Moreover the composition of the invention does not lose the excellent physical, chemical properties which are inherent in polyacetal. This is attained by use of two kinds of stabilizers in combination. A polyacetal resin composition of the invention comprises a polyacetal resin as the matrix, (A) 0.01 to 2.0 percent by weight of a stabilizer selected from a benzotriazole compound, a benzophenone compound and an aromatic benzoate compound and (B) 0.01 to 2.0 percent by weight of a hindered amine compound.

In other words, the invention provides a weather-resistant polyacetal resin compound comprising a polyacetal resin matrix and (A) 0.01–2.0% by weight (relative to the compound as a whole) of one or more kinds of materials selected from the group consisting of benzotriazol-based materials, benzophenone-based materials, and aromatic benzoate-based materials, and (B) 0.01–2.0% by weight (relative to the compound as a whole) of one or more kinds of hindered amine-based materials admixed with and incorporated in the matrix.

For the purpose of a polyacetal resin matrix in the compound of the invention can be utilized any of the following: polyoxymethylene homopolymer, or polyacetal copolymer or terpolymer in which main chains consist principally of polyoxymethylene chains. There is no particular limitation as to their polymerization degree.

One of the weathering stabilizer (light-resisting agent) compounds (i.e. component A) in the compound of the invention comprises 0.01–2.0% by weight (relative to the whole compound) of one or more kinds of materials selected from the group consisting of benzotriazol-based materials, benzophenone-based materials, and aromatic benzoate-based materials. Among these materials are, for example, 2-(2'-hydroxy-5'-methylphenyl)benzotriazol, 2-(2'-hydroxy-3',5'-di-t-butylphenyl)benzotriazol, 2-(2'-hydroxy-3',5'-di-isoamylphenyl)benzotriazol, 2-[2'-hydroxy-3',5'-bis-($\alpha,\alpha$ dimethylbenzyl)phenyl]benzotriazol, 2-(2'-hydroxy-4'-octoxyphenyl)benzotriazol, 2,4-dihydroxy benzophenone, 2-hydroxy-4-methoxybenzophenone, 2-hydroxy-4-octoxybenzophenone, 2-hydroxy-4-dodecyloxy benzophenone, 2,2'-dihydroxy-4-methoxy benzophenone, 2,2'-dihydroxy-4,4'-dimethoxy benzophenone, 2-hydroxy-4-methoxy-5-sulfobenzophenone, 2-hydroxy-4-oxybenzyl benzophenone, p-t-butylphenyl salicylate, and p-octyl phenyl salicylate.

Another essential component of the weathering (light) stabilizer, that is, component B in accordance with the invention comprises 0.01–2.0% by weight (relative to the whole compound) of a hindered amine-based material or materials.

Hindered amine-based materials used for the purpose of the invention are piperidine derivatives having stereohindered groups. Among various such materials are, for example, 4-acetoxy-2,2,6,6-tetramethyl piperidine, 4-stearoyloxy-2,2,6,6-tetramethyl piperidine, 4-acryloyloxy-2,2,6,6-tetramethyl piperidine, 4-methoxy-2,2,6,6-tetramethyl piperidine, 4-benzoyloxy-2,2,6,6-tetramethyl piperidine, 4-cyclohexyloxy-2,2,6,6-tetramethyl piperidine, 4-phenoxy-2,2,6,6-tetramethyl piperidine, 4-benzyloxy-2,2,6,6-tetramethyl piperidine, 4-(phenylcarbamoyoxy)-2,2,6,6-tetramethyl piperidine, bis(2,2,6,6-tetramethyl-4-piperidyl)oxalate, bis(2,2,6,6-tetramethyl-4-piperidyl)malonate, bis(2,2,6,6-tetramethyl-4-piperidyl)adipate, bis(2,2,6,6-tetramethyl-4-piperidyl)sebacate, bis(1,2,2,6,6-pentamethylpiperidyl)sebacate, bis(2,2,6,6-tetramethyl-4-piperidyl)terephthalate, 1,2-bis(2,2,6,6-tetramethyl-4-piperidyloxy)ethane, bis(2,2,6,6-tetramethyl-4-piperidyl)hexamethylene-1,6-dicarbamate, bis(1-methyl-2,2,6,6-tetramethyl-4-piperidyl)adipate, and tris(2,2,6,6-tetramethyl-4-piperidyl)benzene-1,3-5-tricarboxylate.

Also effective as component B are high-molecular weight piperidine derivatives, such as, for example those of the recurring unit:

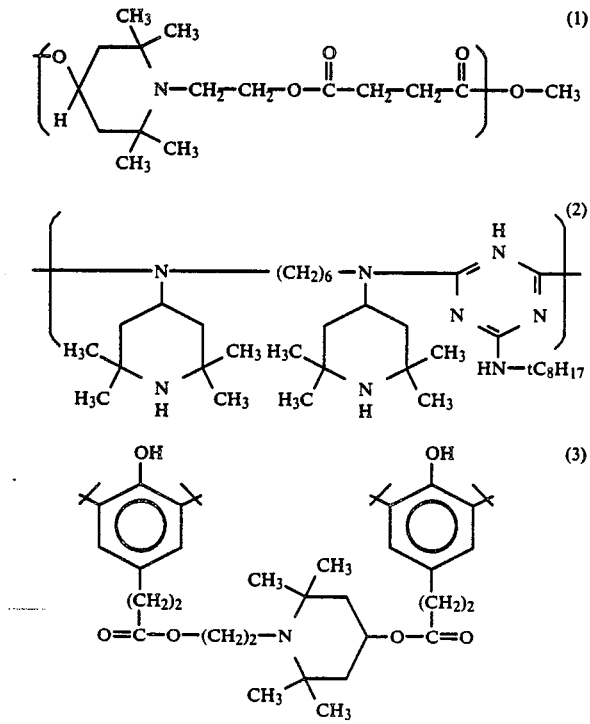

[Effects and Advantages of the Invention]

Among the materials enumerated above for the individual groups, there are many which have already been proposed for use as weathering (light) stabilizers; so they are individually not particularly new.

According to a study conducted by the present inventors, a mere combination of two or more materials is not necessarily effective, and no more than an added effect could be expected from such combination. As is proposed herein, however, it has been found that where different such materials, in the form of a specific combination of materials belonging to group A and materials belonging to group B, are incorporated by admixture in a polyacetal resin matrix, they will exhibit a remarkable synergistic effect. Compounds in which such specific two components are incorporated as weathering (light) stabilizers in the polyacetal resin, it has been found, have much more remarkable weathering (light) stability as compared with any conventional polyacetal compound. Yet their physical/mechanical properties and heat stability are little affected by the presence of the weathering stabilizers. Furthermore, noticeable improvement has been witnessed with the compound of the invention in its effects against deterioration in surface condition of a molded product thereof, after exposure to ultraviolet, e.g. changes in color shade and luster, cracking, downward change in mechanical properties, etc.

The quantity of each of the two weathering stabilizer components A and B used in the invention is suitably within a range of 0.01-2.0% by weight (relative to the whole compound), and more preferably 0.02-1.0% by weight. If their respective contents in the compound are excessively small, no meaningful effect could be expected. Any excessive addition of such components is not only economically unjustifiable, but also it provides no additional effect in weathering quality. Furthermore, such excessive addition is detrimental to the workability of the compound in extruding or molding operation, and it also has an unfavorable effect on the mechanical property and heat stability aspect.

The compound according to the invention is desirably reinforced, in heat stability and/or other characteristic aspect, by adding various different stabilizers to the polyacetal resin matrix. For this purpose, it is desirable to incorporate one or more kinds, in combination, of known oxidation inhibitors, nitrogen-containing compounds, alkalis or alkali earth metal compounds.

Further, the compound in accordance with the invention may be colored in any desired color by a suitable addition of different types of carbon blacks and/or other dyes or pigments.

A combination use of weathering stabilizers as claimed herein is not only effective for imparting weathering properties to the material resin, but also effective in preventing any added dyes or pigments from fading and getting discolored. In this respect, such combined use of stabilizers is very effective for the purpose of maintaining good appearance and quality level of colored products.

The use of carbon blacks in combination with the weathering stabilizers is effective in further enhancing the weathering (light) stability of the compound.

In order to impart still further characteristics to the compound of the invention according as desired for various different purposes, it is possible to incorporate by admixture one or more kinds of known additives, such as for example lubricants, nucleating agents, release agents, antistatic agents, other surface active agents, organic polymeric materials, and inorganic or organic fibrous, particulate, or lamellar fillers.

The compound in accordance with the invention can easily be prepared by any known procedure generally used in the preparation of conventional resin compounds. For example, any of the following methods may be employed; a method in which the comment materials are mixed, and the mixture is then kneaded and extruded by an extruder into pellets, each pellet being subsequently molded into a product; one wherein pellets having different compositions are first prepared, and thereafter, the pellets are mixed in predetermined proportions for molding, so that a molding having a desired composition may be obtained; and one such that one or more component materials are charged directly into a molder.

Further, it is possible that individual components may be added after being held by an organic polymeric material or inorganic material which serves as a retainer agent for them.

[EXAMPLES]

The invention is illustrated by the following examples. It is to be understood, however, that the scope of the invention is not limited by the examples.

In the examples, the following methods were employed in evaluating weathering and other characteristics.

(1) Crack occurrence time

Upon exposure to irradiation by a weatherometer (manufactured by Suga Shikenki K.K., Model WBL-SUN-HCH) under fading conditions at 83° C., each test specimen was examined by a 10× magnifier for cracking. The time at which cracking first occurred was taken as crack occurrence time. The greater the value, the more favorable is the weathering quality.

(2) Tensile strength/elongation

Before exposure to irradiation by the weatherometer and after continued exposure to such irradiation for predetermined periods, each specimen was examined for tensile strength/elongation measurement. The expression "unmeasurable" means that normal measurement could not be done because of conspicuous deterioration of specimen.

(3) Changes in surface condition

Each specimen was examined for changes in color shade and luster due to exposure to irradiation, as compared with its pre-exposure condition. Individual specimens were evaluated for such changes in five different grades. The smaller the value assigned, the less is the change, that is, less deterioration in luster and less fading.

Examples 1-5 and Comparative Examples 1-6

To polyacetal resin (produced by Polyplastics Co.; trade name "Juracon (M90)") were added two kinds of weathering stabilizers, A and B, as specified in Table A. The components were mixed in a Henschel mixer. The mixture was then melt kneaded by employing a 40 mm single-screw extruder, being thus made into a pellet-form compound. The pellet was molded into a test specimen by using an injection molder. The specimen was tested for measurement and evaluation of its weathering and other properties. For comparison purposes, a specimen having no weathering stabilizer incorporated therein, and also one having either component A only or component B only incorporated therein were prepared in a similar manner and tested for evaluation.

The test results are shown in Table 1.

As is apparent from the results, any system in which both weathering stabilizers A and B are present have remarkably greater advantages over not only systems in which such stabilizers are not present, but also systems in which either A or B only is present, in crack occurrence time, tensile strength retention, and surface condition.

TABLE 1

| No. | Weathering stabilizer (wt %) | | Crack occurrence time | Tensile strength-elongation (S kg/cm-E %) | | | Surface condition (600 hr) | (Note) Correspond. Comp. Examp. |
|---|---|---|---|---|---|---|---|---|
| | (Note 1) A (wt %) | (Note 2) B (wt %) | | Before irradiation | Irradiation 600 hr | Irradiation 1000 hr | | |
| Example 1 | A-1 (0.25) | B-1 (0.25) | 420 | 636-60 | 628-26 | 574-18 | 2 | 1,2,4,6 |
| Example 2 | A-1 (0.25) | B-2 (0.25) | 400 | 638-62 | 625-25 | 570-18 | 2 | 1,2,5,6 |
| Example 3 | A-2 (0.25) | B-1 (0.25) | 400 | 637-63 | 630-25 | 560-17 | 2 | 1,3,4,6 |
| Example 4 | A-2 (0.25) | B-2 (0.25) | 380 | 635-65 | 625-23 | 550-16 | 2 | 1,3,5,6 |
| Comp. Example 1 | — | — | 48 | 639-74 | 400>-5> | Unmeasurable | 5 | |
| Comp. Example 2 | A-1 (0.5) | — | 300 | 640-62 | 625-21 | 525-16 | 3 | |
| Comp. Example 3 | A-2 (0.5) | — | 240 | 637-63 | 573-17 | 502-12 | 4 | |
| Comp. Example 4 | — | B-1 (0.5) | 300 | 635-65 | 608-19 | 519-15 | 3 | |
| Comp. Example 5 | — | B-2 (0.5) | 260 | 634-63 | 590-15 | 510-13 | 4 | |
| Comp. Example 6 (Note 3) | A-1 (0.25) A-2 (0.25) | — | 280 | 640-63 | 610-20 | 510-14 | 3 | |
| Example 5 | A-1 (0.25) | B-1 (0.25) | 720 | 645-57 | 655-40 | 640-25 | 1 | |

(Note 1)
A-1: 2-[2'-hydroxy-3',5'-di-t-amyl phenyl]benzotriazole
A-2: 2-hydroxy-4-oxybenzylbenzophenone
(Note 2)
B-1: bis(2,2,6,6-tetramethyl-4-piperidine)sebacate
B-2: dimethyl succinate.1-(2-hydroxyethyl)-4-hydroxy-2,2,6,6-tetramethyl piperidine polycondensate
(Note 3)
0.5 wt % carbon black added to Example 1 (black specimen)

Examples 6-8, Comparative Examples 7-9

To polyacetal resin (produced by Polyplastics Co.; trade Name "Juracon (M90)") were added 1.0% of carbon black and weathering stabilizers specified in Table 2. The components were mixed well, and the mixture was then melt kneaded by employing a 40 mmφ twin-screw extruder, being thus made into a black pellet-form compound. The pellet was injection-molded into a test specimen, which was tested for evaluation of its weathering and other characteristics. The test results are shown in Table 2.

TABLE 2

| No. | Weathering stabilizer (wt %) | | Crack occurrence time | Tensile strength-elongation (S kg/cm-E %) | | | Surface condition (1000 hr) | Correspond. comp. example |
|---|---|---|---|---|---|---|---|---|
| | (Note 1) A (wt %) | (Note 2) B (wt %) | | Before irradiation | Irradiation 1000 hr | Irradiation 2000 hr | | |
| Example 6 | A-3 (0.1) | B-1 (0.1) | 680 | 645-52 | 630-25 | 520-15 | 3 | 7 |
| Example 7 | A-3 (0.25) | B-1 (0.25) | 1200 | 640-55 | 638-41 | 570-18 | 2 | 7,8,9 |
| Example 8 | A-3 (0.5) | B-1 (0.5) | 2020 | 638-58 | 642-48 | 628-25 | 1 | 7,8,9 |
| Comp. Example 7 | — | — | 180 | 645-53 | 410-5 | Unmeasurable | 4 | |
| Comp. Example 8 | A-3 (0.5) | — | 720 | 642-54 | 632-23 | 505-15 | 3 | |
| Comp. Example 9 | — | B-1 (0.5) | 680 | 638-55 | 625-21 | 495-10 | 3 | |

(Note 4)
A-3: 2-(2'-hydroxy-5'-methylphenyl)benzotriazole
(Note 2)
B-1: aforementioned (see Table 1)

The embodiments of the invention in which an exclusive property or privilege is claimed are defined as follows:

1. A polyacetal resin composition of improved crack resistance which comprises a polyacetal resin as the matrix, (A) 0.01 to 2.0 percent by weight of a stabilizer selected from a benzotriazole compound and (B) 0.01 to 2.0 percent by weight of a hindered amine compound which is a piperidine derivative having stereohindered groups; the combination of (A) and (B) having a synergistic effect in stabilizing said polyacetal resin against weathering yet having little effect on physical/mechanical properties and heat stability of said polyacetal.

2. A polyacetal resin composition as claimed in claim 1, which further comprises another conventional additive.

3. A polyacetal resin composition as claimed in claim 1 wherein said polyacetal resin is a polyoxymethylene homopolymer, polyacetal copolymer or terpolymer in which main chains consist principally of polyoxymethylene chains.

4. A polyacetal resin composition as claimed in claim 1 wherein said benzotriazole compound is 2-(2'-hydroxy-5'-methylphenyl)benzotriazol, 2-(2'-hydroxy-3',5'-di-t-butylphenyl)benzotriazol, 2-(2'-hydroxy-3',5'-di-isoamylphenyl)benzotriazol, 2-[2'-hydroxy-3',5'-bis-(alpha, alpha dimethyl-benzyl)phenyl]benzotriazol or 2,(2'-hydroxy-4'-octoxyphenyl)benzotriazol.

5. A polyacetal resin composition as claimed in claim 1 wherein said hindered amine compound is 4-acetoxy-2,2,6,6-tetramethyl piperidine, 4-stearoyloxy-2,2,6,6-tetramethyl piperidine, 4-acryloyloxy-2,2,6,6-tetramethyl piperidine, 4-methoxy-2,2,6,6-tetramethyl piperidine, 4-benzoyloxy-2,2,6,6-tetramethyl piperidine, 4-cyclohexyloxy-2,2,6,6-tetramethyl piperidine, 4-phenoxy-2,2,6,6-tetramethyl piperidine, 4-benzyloxy-2,2,6,6-tetramethyl piperidine, 4-(phenylcarbamoyoxy)-2,2,6,6-tetramethyl piperidine, bis(2,2,6,6-tetramethyl-4-piperidyl)oxalate, bis(2,2,6,6-tetramethyl-4-piperidyl)malonate, bis(2,2,6,6-tetramethyl-4-piperidyl)adipate, bis(2,2,6,6-tetramethyl-4-piperidyl)sebacate, bis(1,2,2,6,6-pentamethylpiperidyl)sebacate, bis(2,2,6,6-tetramethyl-4-piperidyl)terephthalate, 1,2-bis(2,2,6,6-tetramethyl-4-piperidyloxy)ethane, bis(2,2,6,6-tetramethyl-4-piperidyl)hexamethylene-1,6-dicarbamate, bis(1-methyl-2,2,6,6-tetramethyl-4-piperidyl)adipate, or tris(2,2,6,6-tetramethyl-4-piperidyl)benzene-1,3,5-tricarboxylate.

6. A polyacetal resin composition as claimed in claim 1 wherein said hindered amine compound is

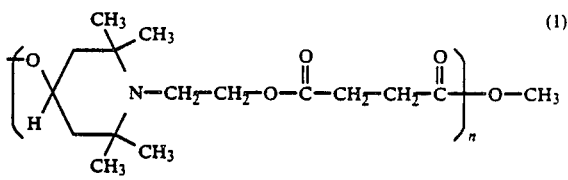

in which n is an integer,

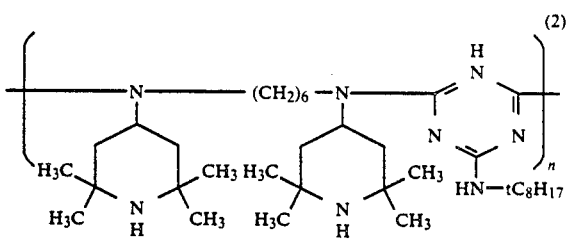

in which n is an integer, or

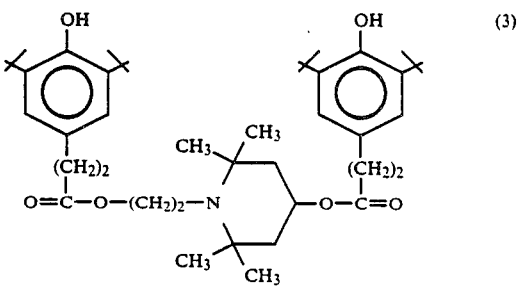

in which n is an integer,

7. A polyacetal resin composition as claimed in claim 1 wherein said compounds A and/or B are present in an amount ranging between about 0.01 and 2.0% by weight.

* * * * *